Sept. 19, 1961    R. W. WATERFILL    3,000,395
AIR CONDITIONING
Filed Aug. 2, 1957

INVENTOR.
ROBERT W. WATERFILL
BY
Pollard Johnston Smythe & Robertson
ATTORNEYS

United States Patent Office 3,000,395
Patented Sept. 19, 1961

3,000,395
AIR CONDITIONING
Robert W. Waterfill, Montclair, N.J., assignor, by mesne assignments, to Buensod-Stacey Corporation, a corporation of Ohio
Filed Aug. 2, 1957, Ser. No. 675,975
13 Claims. (Cl. 137—512.15)

The present invention relates to air conditioning systems, and particularly to a new and improved air volume regulator therefor.

It is well known that variations of fluid pressure in a fluid distribution line or duct may result in an inconstant or varying rate of flow. In air conditioning systems, particularly those employing a central air conditioning apparatus from which air is delivered to a plurality of individual distributing units, pressure variations in the air delivery line or ducts occur frequently by reason of the irregular and changing demand for air in the rooms or zones being conditioned. As an example, where single duct systems are involved, particularly those operating at high pressures, flow of the pre-mixed air within a main duct may vary over wide ranges in response to demands, and such may result in wide variations in the pressure within the main duct. Variations in pressure within the main duct will cause objectionable changes in air distribution, noises, and other undesirable effects, unless the flow is controlled.

Various types of air flow or volume regulators have been employed in such systems in order to maintain substantially constant the rate of flow of air from a main duct to an auxiliary duct leading to a room or zone being conditioned. Certain types of these flow control regulators involve the use of flexible curtain devices that are adapted to cooperate with rigid, perforated motion limiting means. The flexible curtain means is resiliently urged into a position for optimum flow conditions for a given condition. In the event sudden increases or decreases in pressure or volume of flow within the main duct occur, the flexible curtain means is moved into or away from the motion limiting means thereby to decrease or increase the flow of air through the perforated motion limiting means.

Sudden increases in pressure in such devices often cause the flexible curtain means to impact or slap against the motion limiting means, causing audible sounds that are magnified by the drum effect of the duct system, thereby producing objectionable noises in the room or zone being conditioned.

While the present invention can be employed in conjunction with low-pressure systems, it is particularly useful when it is employed with high-pressure arrangements. It can be used as described hereinafter in conjunction with high-pressure systems in which the size of the ducts leading to the volume regulators have a maximum diameter of about two inches to six inches, or the equivalent, the pressure being about two inches of water static pressure and the potential velocity of air in the ducts being between about 1,500 and 3,500 feet per minute, although these values may vary slightly from what is given in what is known as a high-pressure system.

One of the principal objects of the present invention is to provide a flow control or volume regulator within an air conditioning system that will successfully maintain substantially constant the air flowing from a main duct to a room or zone being conditioned, and which regulator will produce substantially noiseless operation.

Another object of the present invention is to provide a curtain-type flow regulator in which means is provided for cushioning the action of the flexible curtain means in its operation incident to sudden increases in pressure within the main duct.

Another object of the present invention is to provide a simple and inexpensive adaptation to a motion limiting means in a flow regulator device that will effectively prevent audible noises being produced by the impact or slap of the flexible curtain means against the motion limiting means.

One phase of the present invention may employ a volume regulator having a swingable, flexible curtain means movable in the path of air flow through the regulator. A motion limiting means may be employed in cooperating position with the curtain means and have fluid passage means extending therethrough. The position of the curtain means relative to the limiting means may control the volume of pre-mixed air passing through the regulator. The motion limiting means may act as a valve seat for the flexible curtain and it may also have a plurality of apertures therein, or be of any suitable screen-like structure. For example, it may consist of bars or abutments extending across the passage in various manners against which the curtain can move. Furthermore, the fluid passage means may be completely open or unimpeded, and there may be ribs in the curtain itself engaging margins of the opening for limiting the motion of the curtain outwardly through the opening.

The curtain means may be restrained by any one of many arrangements which may be yieldable in nature so that the curtain means may be moved against the motion limiting means progressively from the top to the bottom thereof in response to increases in pressure within the supply duct leading to the regulator. One or more curtains can be used. The resilient means may take any one of a number of forms and may include a reciprocable rod having pivotally mounted arms extending from its lower portion to engagement with the bottom of the screen-like curtain, and a compression spring may be arranged to urge the rod vertically to a position tending to maintain the curtain at a predetermined location within the regulator. The arrangement may be such that sudden variations in pressure within the regulator or the supply duct leading thereto will cause the vertical rod to move one way or the other thereby to permit cooperation between the curtain and its seat or limiting means to maintain the flow of air passing through the regulator at a predetermined, constant rate. A stabilizing frame means may or may not be used as desired.

The present invention contemplates the employment of a device or devices which may take varying forms and be located in strategic points over the perforated motion limiting means to trap a certain quantity of the air passing through the regulator, or to restrict the rate of flow therethrough, thereby to build up a column or cushion of air between the motion limiting means and the flexible curtain means so that it acts as a cushioning means between the flexible curtain means and the motion limiting means.

In another aspect, flat plates or means to give an irregular pattern of flow openings such as to modify the uniform pull on the curtain may be employed.

These and other objects, advantages and features of the invention will become apparent from the following description and accompanying drawings which are merely exemplary.

Figure 1:
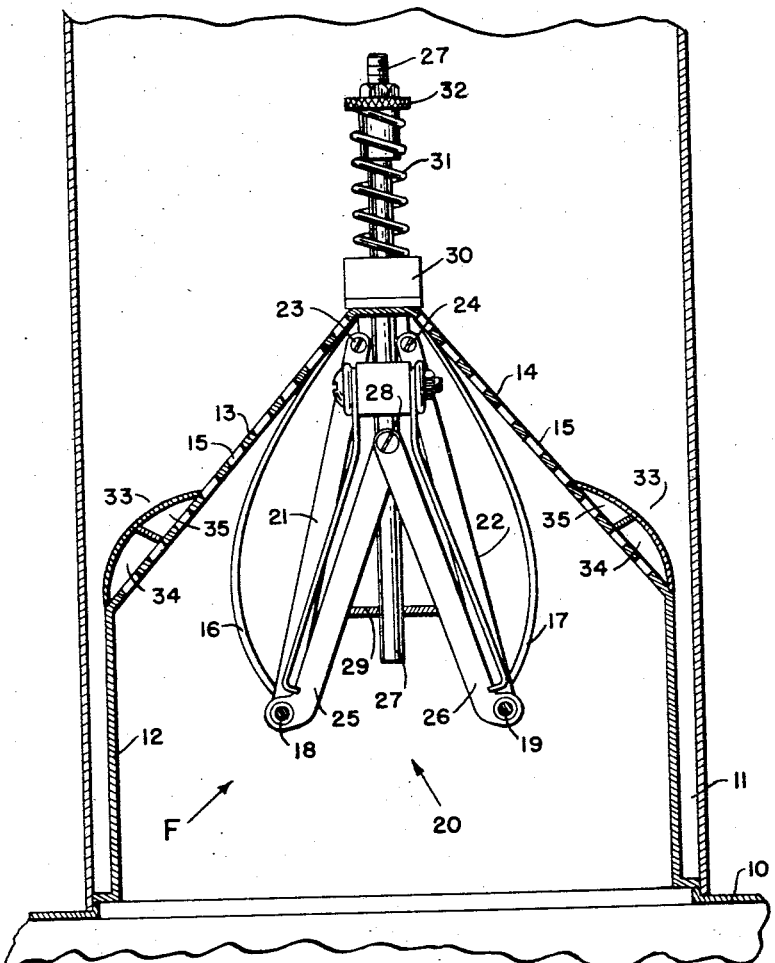
FIGURE 1 is a schematic representation of a portion of an air conditioning system to which an air flow regulator embodying the principles of the invention is applied.
Figures 2, 3, 4:
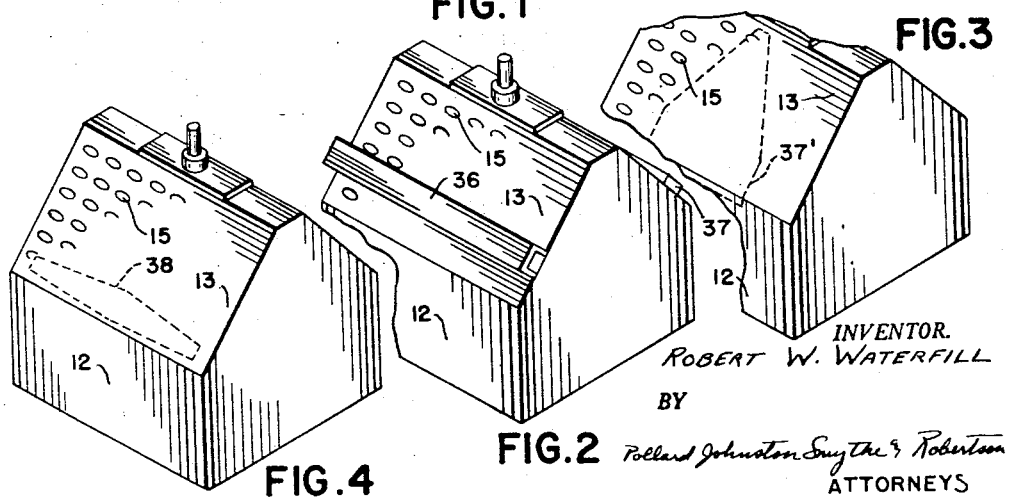
FIG. 2 is a perspective view of the flow control regulator shown in FIG. 1, but with another form of structure to which the principles of the invention have been applied.
FIG. 3 is a fragmentary perspective view of another form of the regulator.
FIG. 4 is a fragmentary perspective view of a still further form of the regulator.

Referring to FIG. 1, the principles of the invention are shown as applied to an air conditioning system including a main air duct 10 through which pre-mixed warm and cool air, or either of them, is adapted to be forced under pressure. A duct 11 leading from the main duct 10 is adapted to direct a portion of pre-mixed air flowing in the main duct 10 to a room or zone being conditioned. In order to maintain a constant rate of flow through the duct 11 independently of increased or decreased pressure of the mixed air within the main duct 10, a flow regulator F is mounted within the duct 11. It may comprise a housing 12 having a general outline as shown in FIG. 2, and provided with angularly disposed motion limiting means 13 and 14. The motion limiting means 13 and 14 may be of any screen-like construction so that they are adapted to pass air therethrough. They are shown as embodying perforations 15 therein extending over the entire area of each of the limiting means. Flexible curtain means 16 and 17 may be fastened adjacent the apex of the triangle formed by the limiting means 13 and 14. This connection between the flexible curtain means 16 and 17 and the upper edges of the limiting means 13 and 14 may be effected by any rod, bar or angle member extending along the length of the housing 12 and rigidly fastened thereto with the upper edges of the curtain means 16 and 17 clamped therebetween. Thus, the curtain means 16 and 17 may swing about axes slightly spaced apart from each other, and defining lines transverse to FIG. 1 and extending through the length of the housing 12. The curtain means 16 and 17 may be separate or they may be of one piece.

Rods 18 and 19 may be connected, respectively, to the free ends of the curtain means 16 and 17, and the latter may be guided in their movements by swingable stabilizing frame means shown generally at 20. This frame means 20 may include the rods 18 and 19 which may be fixed to radius rods 21 and 22 pivotally mounted at points 23 and 23, respectively, adjacent the edges of the housing 12 at which the upper ends of the flexible curtain means 16 and 17 are attached.

The length of the radius arms 21 and 22 is shorter than the distance extending from the hinge axes of the upper ends of the flexible curtain means 16 and 17 to the longitudinally extending rods 18 and 19. Thus, when the swingable curtains 16 and 17 are in a substantially vertical position, they will be relatively stretched or flattened out as compared with the condition that exists when the radius rods are swung outwardly. As a result of the swinging movement about the offset pivots or hinges 23, 24 and the clamped edges of the flexible means 16 and 17, the slack will increase in the curtain means as the frame means is swung toward flow decreasing position so as to permit the curtain to progressively cover the air passages 15 of the motion limiting means 13 and 14.

Radius rods 25 and 26 are connected at their one ends to the longitudinally extending rods 18 and 19, respectively, and at their other ends they are pivotally connected on a single axis extending through a vertically reciprocable rod 27. The upper ends of the rods 25 and 26 may be bifurcated in order to be connected on a pivot pin 28 extending through the vertically disposed rod 27. The rod 27 is adapted to be reciprocated within a slide bearing 29 extending between the opposite walls of the housing 12. The rod 27 is adapted to be vertically moved in order to cause the radius arms 21 and 22 to be pivoted about their pivot points 23 and 24 thereby to cause the flexible curtain means 16 and 17 to cooperate with the motion limiting means 13 and 14. The rod 27, therefore, extends vertically upwardly through the top of the housing 12. A collar 30 is integral with the top of the housing 12 and is adapted to support a spring 31 through which the rod 27 extends. A nut 32 is threaded onto the upper extremity of the rod 27, and it is adapted to cooperate with the spring 31 to permit its pre-loading, thereby to regulate the flow of pre-mixed air from the main duct 10 through the duct 11 to the zone or room being conditioned. It is quite evident that a predetermined setting of the nut 32 will provide a predetermined force in spring 31 tending to raise the rod 27. The air acting on the interior surfaces of flexible curtains 16 and 17 tends to force the radius rods 21 and 22 about their pivots 23 and 24 thereby to effect cooperation between the flexible curtain means 16 and 17 and the perforated motion limiting means 13 and 14. By lowering the nut 32, an increased force will be produced by spring 31 and, consequently, a greater amount of air will pass through the perforations 15 than will pass therethrough with the nut 32 exerting a lesser amount of force on the spring 31.

From the foregoing it is evident that the nut 32 and spring 31 can be pre-adjusted to permit a given amount of air to pass through the perforated motion limiting means 13 and 14 with a given flow of air through the main duct 10. Usually the pre-setting of the spring 31 and nut 32 is such that optimum conditions of flow are maintained with the curtain means 16, 17 in a mean position. Should sudden increases or decreases in pressure occur within the main duct, the flexible curtain means 16 and 17 will respond and move outwardly or inwardly, carrying the radius rods 21 and 22 against the action of the spring 31 which tends to maintain the vertically disposed rod 27 in a pre-set position.

An air restricting means 33 may be fixed to the exterior surface of the motion limiting means 13 and 14 at strategic locations thereon. The means 33 may take the form of a chamber overlying part of the perforations 15 within the motion limiting means 13 and 14, which chamber may generally allow the passage of a portion of the air therein. It can be considered that means 33 forms a second pressure chamber to modify flow of air through the face of a unit. In this way, the chamber 33 builds up a column of air normal to the surface of the motion limiting means, and between it and the flexible curtain means 16 and 17. Accordingly, the movement of the flexible curtain means against the limiting means 13, 14 caused by any sudden increase in pressure within the regulator or the main duct 10 will be cushioned by this column of air. As previously described, the chamber 33 may take varying forms including one having multiple chambers 34 and 35, one of which chambers may be open for the restricted leakage of air therefrom, whereas the other may be of such nature as to entrap a certain volume of air therein.

In FIG. 2, the chamber may take the form of a channel member 36 extending along the outer surface of the limiting means 13 and covering a predetermined number of the air passages 15 extending therethrough. The channel member 36 may be opened at each end, thus providing an elongated air cushion between the curtain means 16 and the motion limiting means 13 which will gradually dissipate and permit the flexible curtain means 16 to progressively contact and cover increasing numbers of the passages 15 extending through the limiting means 13 and 14.

In FIG. 2 on one side of the regulator is shown a flat blank element 37 which amounts to the reverse of the channel 36. In this embodiment, the flat blank has substantially the same effect as the channel member. The flat blank may or may not extend the entire length of the motion limiting means.

Although the location of the cushion means 36 and 37 may be at any desired point on the perforated motion limiting means 13 and 14 of the regulator, it is shown, and preferably should be, near the lower end thereof where its greatest efficacy will be felt.

In FIG. 3, plate 37' can be placed over the openings to present an irregular pattern. The other side may have a plate of a different shape, or the plate can be omitted.

FIG. 4 shows a plate 38 tapered from the center. Having the two or multiple curtains with their supports linked mechanically with dissimilar relief areas to give unequal curtain action has been found effective in eliminating objectionable slap.

Although the various features of the new and improved air conditioning noiseless air flow regulator have proved satisfactory and have been shown and described in detail to fully disclose several embodiments of the invention, it will be evident that numerous changes may be made in such details, and certain features may be used without others without departing from the principles of the invention.

What is claimed is:

1. An air conditioning system air flow regulator for maintaining a substantially constant flow of air to a room or zone being conditioned, including a plurality of flexible curtain means within the air flow passing through said regulator; motion limiting means cooperating with said flexible curtain means; means mechanically linking said curtains; and means for causing the air passing through said regulator to cushion the impact between said flexible curtain means and said motion limiting means.

2. An air conditioning system air flow regulator for maintaining substantially constant the flow of air to a room or zone being conditioned, including flexible curtain means within the air flow through said regulator; perforated motion limiting means adapted to cooperate with said flexible curtain means; and means cooperating with said motion limiting means within the area of cooperation between said curtain means and said motion limiting means for restricting the rate of flow of air through a portion of said perforated motion limiting means to a rate less than that normally flowing through the remainder of said perforated motion limiting means.

3. In an air conditioning system, duct means through which air is adapted to pass; flow regulating means within said duct means for maintaining a substantially constant flow of air to a room or zone being conditioned, including flexible curtain means; perforated motion limiting means cooperating with said flexible curtain means to control the flow of air through said perforated motion limiting means; and means cooperating with said perforated motion limiting means for entrapping a portion of the air passing therethrough thereby to cushion the impact between said flexible curtain means and said motion limiting means.

4. In an air conditioning system, duct means through which air is adapted to pass; flow regulating means within said duct means for maintaining a substantially constant flow of air to a room or zone being conditioned, including flexible curtain means; perforated motion limiting means cooperating with said flexible curtain means to vary the rate of flow through said perforated motion limiting means in response to pressure within said duct means; and plural chamber means cooperating with said perforated motion limiting means within the area of cooperation between said curtain means and said motion limiting means for trapping a portion of the air passing through said limiting means and for restricting the rate of flow of the air passing through a portion of said limiting means to a rate substantially less than the rate at which the air normally passes through the remainder of said perforated motion limiting means.

5. In an air conditioning system, duct means through which air is adapted to pass; flow regulating means within said duct means for maintaining a substantially constant flow of air to a room or zone being conditioned, including flexible curtain means; perforated motion limiting means cooperating with said flexible curtain means; and a channel member extending along at least one side of said motion limiting means and covering a predetermined number of the perforations therein within the area of cooperation between said curtain means and said motion limiting means.

6. In an air conditioning system, duct means through which air is adapted to pass; flow regulating means within said duct means for maintaining a substantially constant flow of air to a room or zone being conditioned independently of fluctuations of pressure within said duct means, and including flexible curtain means; perforated motion limiting means cooperating with said flexible curtain means; and means for blocking off a predetermined number of perforations within said motion limiting means within the area of cooperation between said curtain means and said motion limiting means thereby to cushion the impact between said flexible curtain means and said motion limiting means when the former is subject to sudden increases in pressure within the duct means.

7. In an air conditioning system, pre-settable flow regulating means for maintaining a substantially constant flow of air to a room or zone being conditioned, including flexible curtain means; motion limiting means cooperating with said flexible curtain means thereby to control the flow of air through said motion limiting means; and means for causing the air passing through said regulator to cushion the impact between said flexible curtain means and said motion limiting means.

8. In an air conditioning system, pre-settable flow regulating means for maintaining a substantially constant flow of air to a room or zone being conditioned, including flexible curtain means; motion limiting means cooperating with said flexible curtain means thereby to control the flow of air through said motion limiting means; and means within the area of cooperation between said curtain means and said motion limiting means adapted to cooperate with said motion limiting means for restricting the rate of flow of air through a portion of said motion limiting means to a rate less than that normally flowing through the remainder of said motion limiting means.

9. In an air conditioning system, pre-settable flow regulating means for maintaining a substantially constant flow of air to a room or zone being conditioned, including flexible curtain means; perforated motion limiting means cooperating with said flexible curtain means thereby to control the flow of air through said perforated motion limiting means; and means cooperating with said perforated motion limiting means for entrapping a portion of the air passing therethrough thereby to cushion the impact between said flexible curtain means and said perforated motion limiting means.

10. In an air conditioning system, pre-settable flow regulating means for maintaining a substantially constant flow of air to a room or zone being conditioned, including flexible curtain means; perforated motion limiting means cooperating with said flexible curtain means thereby to control the flow of air through said perforated motion limiting means; and plural chamber means within the area of cooperation between said curtain means and said motion limiting means for trapping a portion of the air passing through said limiting means and for restricting the rate of flow of the air passing through a portion of said limiting means to a rate substantially less than the rate at which the air normally passes through the remainder of said perforated motion limiting means.

11. In an air conditioning system, pre-settable flow regulating means for maintaining a substantially constant flow of air to a room or zone being conditioned, including flexible curtain means; perforated motion limiting means cooperating with said flexible curtain means thereby to control the flow of air through said perforated motion limiting means; and a channel member extending along at least one side of said motion limiting means and covering a predetermined number of the perforations therein within the area of cooperation between said curtain means and said motion limiting means.

12. In an air conditioning system, pre-settable flow regulating means for maintaining a substantially constant flow of air to a room or zone being conditioned, including flexible curtain means; perforated motion limiting means cooperating with said flexible curtain means thereby to control the flow of air through said perforated motion limiting means; and plate means within the area of cooperation between said curtain means and said motion limiting means for blocking off a predetermined number of the perforations within said motion limiting means thereby to cushion the impact between said flexible curtain means and said motion limiting means when the former is subject to sudden increases in pressure.

13. An air conditioning system air flow regulator for maintaining substantially constant flow of air to a room or zone being conditioned, including a plurality of flexible curtain means in the flow of air through said regulator; motion limiting means cooperating with said flexible curtain means; means mechanically linking said curtains; and dissimilar air passages through said motion limiting means within the area of cooperation between said curtain means and said motion limiting means.

References Cited in the file of this patent

UNITED STATES PATENTS

| | | |
|---|---|---|
| 765,200 | Schmidt | July 19, 1904 |
| 1,160,864 | DeVaughn | Nov. 16, 1915 |
| 1,432,900 | Quiroga | Oct. 24, 1922 |
| 1,867,478 | Stelzner | July 12, 1932 |
| 2,302,447 | King | Nov. 17, 1942 |
| 2,705,595 | Carlson | Apr. 5, 1955 |
| 2,787,288 | Shataloff | Apr. 2, 1957 |

FOREIGN PATENTS

| | | |
|---|---|---|
| 364,813 | Germany | Dec. 1, 1922 |